United States Patent Office
3,438,725
Patented Apr. 15, 1969

3,438,725
PROCESS FOR THE MANUFACTURE OF SODIUM TRIPOLYPHOSPHATE WITH A HIGH CONTENT OF THE LOW TEMPERATURE MODIFICATION
Gero Heymer, Knapsack, near Cologne, Heinz Harnisch, Lovenich, near Cologne, Gerhard Hartlapp, Hermulheim, near Cologne, and Karl Traulsen, Knapsack, near Cologne, Germany, assignors to Knapsack Aktiengesellschaft, Knapsack, near Cologne, Germany, a corporation of Germany
No Drawing. Filed July 7, 1967, Ser. No. 651,691
Claims priority, application Germany, Aug. 6, 1966, K 59,977
Int. Cl. C01b 25/30
U.S. Cl. 23—106         2 Claims

ABSTRACT OF THE DISCLOSURE

Production of sodium tripolyphosphate containing less than 10% of weight high temperature modification (phase I) with the use of a phosphate solution containing a maximum of 0.26% by weight sulfate ions and a maximum of 0.11% by weight foreign elements, referred to $P_2O_5$.

The present invention relates to a one-step process for the production of sodium tripolyphosphate, inside a spray tower, from phosphate solutions produced in customary manner from phosphoric acid, which is based on wet-processed crude phosphates and has been purified and neutralized to contain $Na_2O$ and $P_2O_5$ in a ratio corresponding to that desired for the final product.

Sodium tripolyphosphate is known to exist in two different crystalline modifications comprised of the high temperature modification, also termed form-I or phase-I, which is stable at temperatures above about 420° C. up to the peritectic decomposition point at 622° C., and of the low temperature modification, also termed form-II or phase-II, which is stable at temperatures lower than about 420° C. These two forms are briefly called hereinafter $Na_5P_3O_{10}$-I and $Na_5P_3O_{10}$-II.

Detergent slurries are conveniently prepared with the use of $Na_5P_3O_{10}$-II or at least with the use of sodium tripolyphosphate containing less than 10% form-I because the high hydration velocity of form-I produces effects that are difficult to control.

Various processes for the production of pure or substantially pure $Na_5P_3O_{10}$-II have already been described. Most of these relate to the production in two stages, comprising spray-drying an orthophosphate solution containing $Na_2O$ and $P_2O_5$ in a molar ratio of 5:3, and thereafter calcining it inside a rotary kiln, the calcination being intended to eliminate water and to produce intermolecular condensation with the resultant formation of the tripolyphosphate chain.

One-step processes, wherein sodium tripolyphosphate is produced within seconds have also been disclosed. Reference is made to U.S. Patent 2,898,189, wherein an orthophosphate solution is sprayed, inside a spray tower of special design, to pass through a flame ring whereby the individual droplets travelling through the hot flame zone are dehydrated and condensed within seconds to form tripolyphosphate and ultimately inflated to hollow structures formed of crystallized sodium tripolyphosphate.

It will readily be understood that this process which enables orthophosphate solutions to be transformed in a single step into flowable tripolyphosphate, can be carried out under conditions substantially more economic than those used in two-step processes. However, the production of material of high form-II content may be found to be impaired by the fact that the individual droplets passed through the flame zone are subject to varying temperatures. When the individual particles travel through the flame zone at equal velocity, the water included in small droplets will be found to be vaporized more rapidly than that included in large droplets with the result that remaining solid matter of those small droplets is subject in the flame to temperatures higher than remaining solid matter of large droplets, which are found to have travelled through the flame before such higher temperature is reached. In other words, the final product may be found to contain an appreciable proportion of form-I although the combustion gases leave the spray tower at temperatures lower than 420° C.

As taught in U.S. Patent 2,977,317, it is possible to obviate the appearance of $Na_5P_3O_{10}$-I in the one-step process. To this end, it is necessary to provide for a steam partial pressure sufficiently high inside the reaction tower. Depending on the other reaction conditions, this may be achieved by means of the water supplied together with the orthophosphate solution or by the supply of additional water, for example by using steam as the agent for spraying the solution.

Sodium tripolyphosphate free from form-I can be readily prepared by either of the processes described in these two patents, given that so-called "thermal" phosphoric acid, i.e. phosphoric acid based on electrothermal phosphorus is used for making the feed solutions. However, considerable difficulties are encountered therein when phosphoric acid based on crude phosphates "wet-processed" by means of an acid, is used for making the feed solutions. Conditions normally known to ensure the production of pure $Na_5P_3O_{10}$-II when thermal phosphoric acid is used, have been found to entrain the formation of material containing 15–30% form-I, and it has proved impossible to obviate these difficulties by variation of the reaction conditions. The use of phosphoric acids produced from various wet-processed crude phosphates or purified by different methods, for example in the spray process of German Patent 1,224,717 has always been found to produce sodium tripolyphosphate containing more than 10% form-I, i.e. sodium tripolyphosphates which fail to meet the demands made on them. The proportion of $Na_5P_3O_{10}$-I present in these products has been found to vary with the type of phosphoric acid used, but reduction thereof has proved impossible, even by variation of the customary steps.

No or substantially no such differences in the $Na_5P_3O_{10}$-I content are encountered in two-step rotary kiln processes using either wet or thermal phosphoric acid. In view of the fact, however, that one-step spray tower processes enable sodium tripolyphosphate to be produced under more economic conditions, it has been desirable to develop a process obviating the difficulties mentioned above.

It has now unexpectedly been found that the difficulties mentioned above can be obviated and that sodium tripolyphosphate containing less than 10% form-I can be produced by the one-step spray tower process even with the use of phosphate solutions based on wet phosphoric acid, given that the phosphate solution used contains a maximum of 0.26% by weight sulfate ions and a maximum of 0.11% by weight foreign elements, referred to $P_2O_5$.

The term "foreign elements" as used herein is intended to mean all chemical elements, except phosphorus, sodium, oxygen and hydrogen, and sulfur bound in the $SO_4^{--}$ ion. These foreign elements usually comprise aluminum, arsenic, barium, calcium, cobalt, chromium, copper, fluorine, iron, magnesium, manganese, nickel, lead, silicon, titanium, uranium, vanadium, zinc, and zirconium.

In the event that the wet phosphoric acid used for making the phosphate solutions contains more than 0.26% by weight sulfate and more than 0.11% by weight foreign elements, referred to $P_2O_5$, there is conveniently added thereto a proportion of thermal phosphoric acid sufficient to obtain a mixture containing less than 0.26% by weight sulfate and less than 0.11% by weight foreign elements, referred to $P_2O_5$. The mixture so obtained can be used thereafter to serve as the starting component. As wet phosphoric acid is always found to include quite a plurality of foreign elements, which differ but slightly in their individual effects, when present in a concentration by weight as indicated above, it would appear to be clear that differences in the composition of impurities, which may originate, for example, from the use of different crude phosphates or different purification methods, influence but insignificantly the total effect produced.

The fact that the present invention enables the problem to be solved is an unexpected result that has first been inexplicable because the replacement of very pure thermal phosphoric acid, in the rotary kiln process, with wet phosphoric acid, which is often less pure even after purification, could not be found to entrain similar difficulties with respect to the form-I content of the final product. Careful investigation has shown that the mechanism underlying the present process can be explained, which in turn enables the different behaviour of those acids in the spray tower and rotary kiln processes to be readily explained.

$Na_5P_3O_{10}$-I based on thermal phosphoric acid is known to be very pure and to have a large surface area; when annealed under a high partial pressure of steam, at a temperature of 350 to 380° C., i.e. within the stability range of $Na_5P_3O_{10}$-II, the form-I compound is found to transform with a half-life period of some minutes into $Na_5P_3O_{10}$-II. The fact that the transformation occurs so rapidly has not been reported previously, but this can be readily proved by simple means under corresponding conditions. In the event, however, that the thermal phosphoric acid is mixed, prior to the production of $Na_5P_3O_{10}$-I, with material containing trace impurities, such as included in wet phosphoric acid, it is found that most of these foreign elements have the effect of slightly reducing the transformation velocity. The activities of the individual impurities add together, and the joint addition of all foreign element traces usually contained in purified wet phosphoric acid, is found to obviate the transformation or make it proceed over periods unacceptable from a technical point of view, depending on the total concentration.

As described above, in the spray tower process, small droplets traveling through the flame zone are heated to higher temperatures than large droplets with the effect that sodium tripolyphosphate produced therefrom may contain considerable proportions of $Na_5P_3O_{10}$-I. When very pure thermal phosphoric acid is used in the process of U.S. Patent 2,977,317 the form-I proportion transform into $Na_5P_3O_{10}$-II given that the product is gradually cooled under a steam partial pressure sufficiently high. However, in the event that the transformation is delayed by the presence of foreign elements, which are contained in most wet acid products, a considerable proportion of form-I is found to be retained in the final product. The rather obvious idea of reducing the total temperature in this process down to a value at which the small particles travelling through the flame zone are prevented from being heated to the temperature necessary for the formation of form-I, cannot be realized. The reason is that the short period left for large particles to flow through the flame zone would be insufficient for them to reach the temperature necessary for the formation of sodium tripolyphosphate. In other words, it is necessary to use the steps described in the present invention where wet phosphoric acid is used in the one-step spray tower process for the production of sodium tripolyphosphate with a high content of form-II.

The facts underlying the present invention, interpreted as outlined above, also appear readily to provide the explanation why no such problems are encountered in rotary kiln processes. In these processes, the solution is spray-dried and water of constitution is separated thereafter, while gradually increasing the temperature, so that all of the product particles are slowly and uniformly heated to the desired temperature (350–400° C.), which is not exceeded. In other words, the form-I stability range is not reached. No form-I product can accordingly form, where special steps wouldl be required to be taken for transformation into form-II.

The following examples are of interest in the present invention:

EXAMPLE 1

Purified wet phosphoric acid containing 0.4% by weight sulfate and 0.13% by weight foreign elements, referred to $P_2O_5$, was used to produce a solution containing $Na_2O$ and $P_2O_5$ in a molar ratio of 5:3 and 27.5% $P_2O_5$. 29 tons of the solution so produced, which had a temperature of 90° C., were sprayed over a period of 3 hours inside a spray tower, as disclosed in U.S. Patents 2,898,189 and 2,977,317. The outgoing gas left the tower at a temperature of 350° C. Sodium tripolyphosphate separated therefrom was found to have a purity of 97.5% and to contain 0.23% $SO_4$ as well as a total of 0.075% further impurities. The form-I content was found to be 22%.

EXAMPLE 2

Purified wet phosphoric acid containing 0.024% by weight sulfate and 0.17% by weight foreign elements, referred to $P_2O_5$, was used to produce a solution containing $Na_2O$ and $P_2O_5$ in a molar ratio of 5:3 and 27.0% $P_2O_5$. 28 tons of the solutions so produced were sprayed under the same conditions as those used in Example 1. The resulting sodium tripolyphosphate was found to have a purity of 97% and to contain 0.014% $SO_4$ as well as a total of 0.096% further impurities. The form-I content was found to be 14%.

EXAMPLE 3

Thermal phosphoric acid containing 0.009% by weight sulfate and less than 0.005 by weight foreign elements, referred to $P_2O_5$, and a sodium hydroxide solution were used to produce a solution containing $Na_2O$ and $P_2O_5$ in a molar ratio of 5:3 and 29.4% $P_2O_5$. In 32 tons of the solution so produced there were dissolved 120.2 kg. $Na_2SO_4$ and the resulting mixture was sprayed thereafter under the conditions set forth in Example 1. The sodium tripolyphosphate so made was found to have a purity of 97% and to contain 0.5% $SO_4$ as well as a total of less than 0.005% further impurities. The form-I content was found to be 20%.

A product sample was annealed at 500° C. to increase its form-I content to 65%. Thereafter, the product was finely crushed and annealed again, this time for 2 hours at 360° C. under a steam partial pressure of 400 mm. mercury. This treatment could not be found to reduce the form-I content to a value lower than 55%.

EXAMPLE 4

12.2 kg. $Na_2SO_4$ were dissolved in 32 tons of a solution containing 29.7% $P_2O_5$, produced in the manner set forth in Example 3. The batch so made was sprayed thereafter under the conditions set forth in Example 1. The resulting sodium tripolyphosphate was found to have a purity of 98% and to contain 0.05% $SO_4$ as well as a total of less than 0.005% further impurities. No $Na_5P_3O_{10}$-I could be detected by X-ray investigation.

A product sample was annealed at 500° C. to produce a form-I content of 68%. Thereafter, the product was finely crushed and annealed again, this time at a temperature of 360° C. and under a steam partial pressure of 400 mm. mercury. Pure $Na_5P_3O_{10}$-II was obtained again, within 40 minutes.

EXAMPLE 5

Purified wet phosphoric acid containing 0.21% by weight sulfate and 0.07% by weight foreign elements, referred to $P_2O_5$, was used to produce a solution containing $Na_2O$ and $P_2O_5$ in a molar ratio of 5:3 and 27.7% $P_2O_5$. 31 tons of the solution so produced were sprayed under the same conditions as those used in Example 1. The resulting sodium tripolyphosphate was found to have a purity of 97.5% and to contain 0.12% $SO_4$ as well as a total of 0.04% further impurities. The form-I content was found to be 7%.

EXAMPLE 6

A solution containing 27.2% $P_2O_5$, 0.17% by weight sulfate and 0.05% by weight further foreign elements, the percentages being referred to $P_2O_5$, was produced in the manner set forth in Example 5 from purified wet phosphoric acid. 32 tons of the solution so produced were sprayed under the conditions set forth in Example 1. The resulting sodium tripolyphosphate was found to have a purity of 97.5% and to contain 0.10% $SO_4$ as well as a total of 0.03% further impurities. The form-I content was found to be lower than 5%.

A product sample was annealed at 500° C. to produce a form-I content of 45%. Thereafter, the product was finely crushed and annealed again, this time at 380° C. under a steam partial pressure of 390 mm. mercury. Pure $Na_5P_3O_{10}$-II was obtained within 90 minutes.

EXAMPLE 7

A solution containing 30.4% $P_2O_5$, prepared from thermal phosphoric acid in the manner set forth in Example 3, was used. In 33 tons of this solution there were dissolved the following salts:

|  | Kg. |
|---|---|
| $FeSO_4 \cdot 7H_2O$ | 4.31 |
| NaF | 0.38 |
| $Al_2(SO_4)_3$ | 16.45 |
| $NiSO_4 \cdot 7H_2O$ | 0.41 |
| $Cr_2(SO_4)_3$ | 0.20 |
| $MnSO_4 \cdot H_2O$ | 0.53 |

The above solution was further mixed with solutions of 0.11 kg. $As_2O_3$ and 0.15 kg. $V_2O_5$ in concentrated sodium hydroxide solution, and with 15.0 kg. basic magnesium carbonate (56% MgO), 4.3 kg. ZnO and 5.2 kg. $CaCO_3$, in concentrated phosphoric acid. The batch so made was sprayed under the conditions set forth in Example 1. The resulting sodium tripolyphosphate was found to have a purity of 97% and to contain 0.09% $SO_4$ as well as a total of 0.084% further impurities. This corresponded to a content of 0.16% $SO_4$ and 0.145% further impurities, referred to $P_2O_5$. The form-I content was found to be 18%.

EXAMPLE 8

33 tons of a solution containing 30.2% $P_2O_5$, prepared from thermal phosphoric acid in the manner set forth in Example 3, were mixed with ⅕ of the quantity of each of the substances specified in Example 7. The resulting mixture was sprayed thereafter under the conditions set forth in Example 1. The sodium tripolyphosphate so produced was found to have a purity of 97.5% and to contain 0.02%% $SO_4$ as well as a total of 0.017% further impurities. Only $Na_5P_3O_{10}$-II was found.

We claim:

1. In a one-step spray process for producing tripolyphosphate having no greater than 10% Phase I by spraying through a flame zone a sodium salt feed solution of impure wet-processed phosphoric acid containing a molar ratio of $Na_2O:P_2O_5$ in about the molar ratio desired in the final product, the improvement consisting in spraying a feed solution having a maximum concentration of sulfate ions and foreign elements of about 0.26% and 0.11%, respectively.

2. The process of claim 1, which comprises spraying a sodium salt feed solution obtained by diluting wet-processed phosphoric acid containing more than 0.26% by weight sulfate and more than 0.11% by weight foreign elements, referred to $P_2O_5$, with a quantity of thermal phosphoric acid sufficient to produce a mixture containing less than 0.26% by weight sulfate and less than 0.11% by weight foreign elements, referred to $P_2O_5$, and neutralizing the mixture obtained to about the $Na_2O:P_2O_5$ molar ratio desired in the final product.

References Cited

UNITED STATES PATENTS 3,129,057   4/1964   Germain _____ 23—107

OSCAR R. VERTIZ, *Primary Examiner.*

L. A. MARSH, *Assistant Examiner.*